US006710750B2

(12) United States Patent
Dzieciol

(10) Patent No.: US 6,710,750 B2
(45) Date of Patent: Mar. 23, 2004

(54) MICROWAVE SENSOR ANTENNA

(75) Inventor: Edward Dzieciol, Warsaw (PL)

(73) Assignee: Instytut Techniczny Wojsk Lotniczych, Warsaw (PL)

( * ) Notice: Subject to any disclaimer, the term of this patent is extended or adjusted under 35 U.S.C. 154(b) by 0 days.

(21) Appl. No.: 10/260,967

(22) Filed: Sep. 30, 2002

(65) Prior Publication Data

US 2003/0103013 A1 Jun. 5, 2003

(30) Foreign Application Priority Data

Dec. 3, 2001 (PL) ........................................... 112777 U

(51) Int. Cl.[7] .......................... H01Q 13/00; G01F 17/00
(52) U.S. Cl. ........................................ 343/772; 324/636
(58) Field of Search .......................... 343/772; 324/636, 324/633, 635

(56) References Cited

U.S. PATENT DOCUMENTS 6,359,445 B1 * 3/2002 Pfizenmaier et al. ........ 324/636

* cited by examiner

*Primary Examiner*—Hoang V. Nguyen
(74) *Attorney, Agent, or Firm*—Zbigniew P. Sawicki; Westman, Champlin & Kelly, P.A.

(57) ABSTRACT

Antenna centric duct 1 in the form of long cylinder has a coaxial channel of circular intersection 2 at one end, and a coaxial screwed tongue 3 at the other end. On one third of cylinder length 1 there is a lateral screwed port 4. With the help of the tongue 3, the cylinder 1 is coaxialy connected to the cylindrical housing 5 inside its cylindrical hollow 6 in which there is antenna sleeve 7 with necking, placed on the axis of the hollow 6. Inside the lateral screwed port 4 of the cylinder 1, there is a short support 8 of the waveguide. In the free end of the support, there is a transverse cut 9. In the transverse cut 9 of short support 8 of the waveguide, one end of the waveguide 10 in the shape of rod is located. Its second end is located in transverse cut 11 of long waveguide support 12, located in lateral screwed port 13 of the cylindrical housing 5, at its opposite end. On the housing 5 axis, there is the cut of rectangular intersection 15 to a depth of one third of the housing 5 length. The antenna is used for instantaneous position measurement of movable elements, especially in turbo-machines.

7 Claims, 1 Drawing Sheet

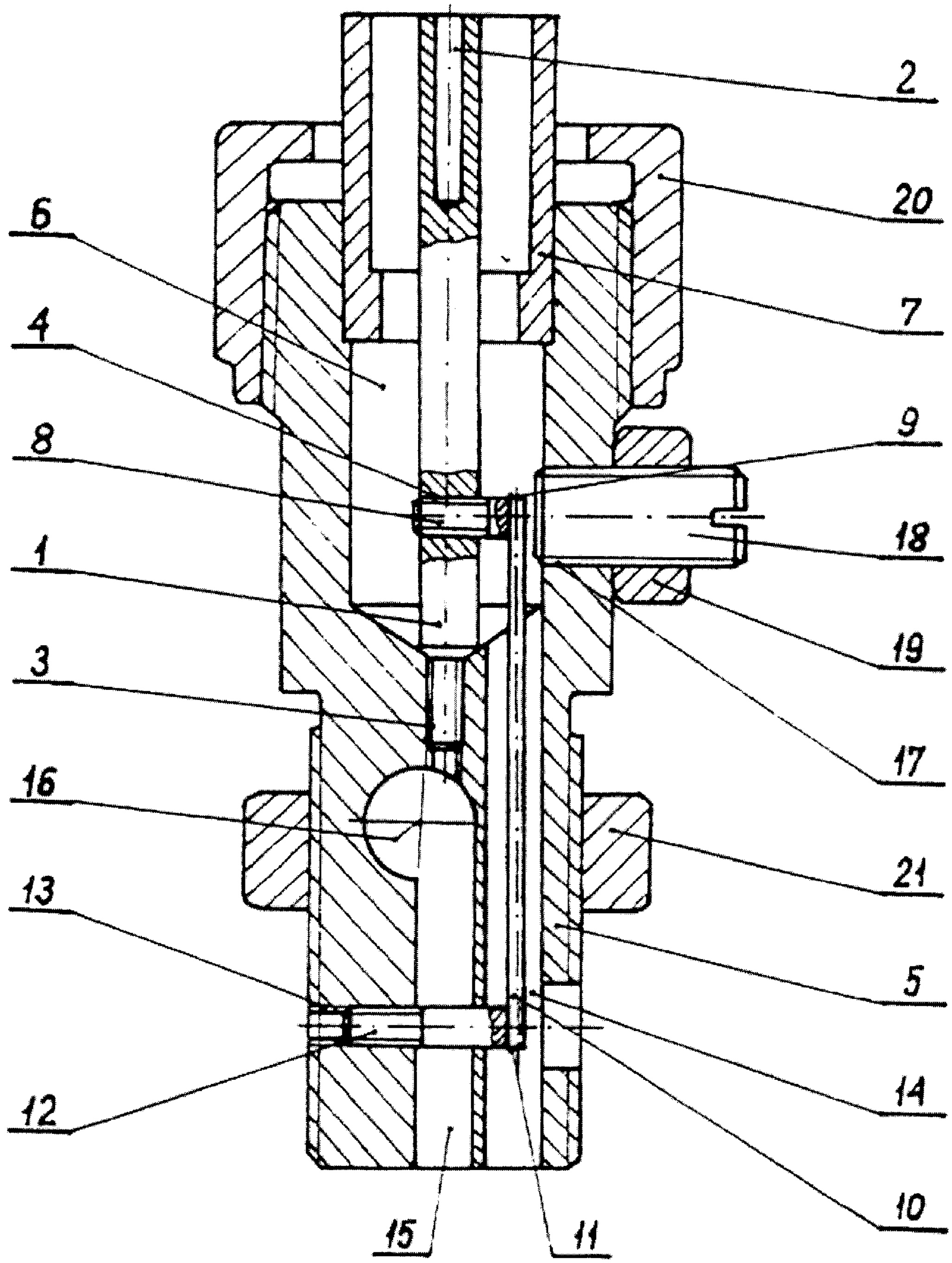
2
20
6
7
4
9
8
18
1
19
3
17
16
21
13
5
14
12
10
15
11

MICROWAVE SENSOR ANTENNA

BACKGROUND OF THE INVENTION

The subject of the invention is the microwave sensor antenna for instantaneous position measurement of movable element, especially in turbo-machine.

The microwave antenna in the shape of waveguide of rectangular or circular intersection is known from the elaboration titled: "Microwave antenna theory and design", Massachusetts Institute of Technology, McGraw-Hill Book Company, Inc. 1949.

BRIEF SUMMARY OF THE INVENTION

The subject of the invention is, that the antenna centric duct in the form of long cylinder has a coaxial channel of circular intersection at one end, and a coaxial screwed tongue at the other end. On one third of cylinder length there is a lateral screwed port. With the help of the tongue, the cylinder is coaxialy connected to the cylindrical housing inside its cylindrical hollow in which there is an antenna sleeve with necking, placed on the axis of the hollow. Inside the lateral screwed port of the cylinder, there is a short support of the waveguide. In the free end of the support, there is a transverse cut. In the transverse cut of short support of the waveguide, one end of the waveguide in the shape of rod of circular intersection is located. Its second end is located in transverse cut of long waveguide support, located in lateral screwed port of the cylindrical housing, at its opposite end. The waveguide is placed inside the cylindrical longitudinal channel, made in parallel to longitudinal axis of the antenna, and connected to the cylindrical hollow inside the housing. On the housing axis, there is the cut of rectangular intersection to a depth of one third of the housing length, located in parallel to cylindrical longitudinal channel and perpendicular to the axis of waveguide long and short support. At the end of the cut inside the housing, there is transversal cylindrical hollow with the diameter equal to dual value of cut width and the axis placed on outside wall face of this cut. Inside the cylindrical wall along the waveguide short support, there is a coaxial hole with a fine thread. Inside the hole there is an antenna adjusting screw cooperating with a back nut. On the outside wall face, from cylindrical hollow side, there is a clamp nut with the escapement, and from the opposite side, the housing has an antenna back nut on its outside face. Free space of the coaxial cylindrical hollow, cylindrical longitudinal channel, and rectangular intersection cut is filled with dielectric body.

BRIEF DESCRIPTION OF THE DRAWINGS

The FIGURE is a sectional view of the present invention.

DETAILED DESCRIPTION

The longitudinal section of the invention subject is shown on the picture. Antenna centric duct 1 in the form of long cylinder has a coaxial channel of circular intersection 2 at one end, and a coaxial screwed tongue 3 at the other end. On one third of cylinder length 1 there is a lateral screwed port 4. With the help of the tongue 3, the cylinder is coaxialy connected to the cylindrical housing 5 inside its cylindrical hollow 6 in which there is antenna sleeve 7 with necking, placed on the axis of the hollow 6. Inside the lateral screwed port 4 of the cylinder 1, there is a short support 8 of the waveguide. In the free end of the support, there is a transverse cut 9. In the transverse cut 9 of short support 8 of the waveguide, one end of the waveguide 10 in the shape of rod of circular intersection is located. Its second end is located in transverse cut 11 of long waveguide support 12, located in lateral screwed port 13 of the cylindrical housing 5, at its opposite end. The waveguide 10 is placed inside the cylindrical longitudinal channel 14, made in parallel to longitudinal axis of the housing 5, and connected to the cylindrical hollow 6 inside the housing. On the housing 5 axis, there is the cut of rectangular intersection 15 to a depth of one third of the housing 5 length, located in parallel to cylindrical longitudinal channel 14 and perpendicular to the axis of waveguide long 12 and short 8 support. At the end of the cut 15 inside the housing 5, there is transversal cylindrical hollow 16 with the diameter equal to dual value of cut 15 width and the axis placed on outside wall face of this cut. Inside the cylindrical wall 5 along the waveguide short support 8, there is a coaxial hole 17 with a fine thread. Inside the hole there is an antenna adjusting screw 18 cooperating with a back nut 19. On the outside wall face of the housing 5, from coaxial cylindrical hollow 6 side, there is a clamp nut 20 with the escapement, and from the opposite side, the housing has an antenna back nut 21 on its outside face. Free space of the coaxial cylindrical hollow 6, cylindrical longitudinal channel 14, and rectangular intersection cut 15 is filled with dielectric body.

Operation: After tuning with an antenna adjusting screw 18, the microwave probing signal is supplied to the input circuit of a standard wave resistance, formed by antenna 1 centric duct and antenna sleeve 7. Then, the signal goes through the waveguide 10 of a standard wave resistance to the waveguide cavity—antenna radiator in the shape of rectangular intersection cut 15, ended with transversal cylindrical hollow 16. The opposite side of the waveguide cavity antenna radiator creates microwave antenna aperture. The microwave probing signal radiates from the aperture around the movable element of a turbo-machine. This signal is the subject to modulation during reflection from movable element of a turbo-machine and it is received in this form by the microwave antenna aperture. After reception, the signal goes to the input circuit via the waveguide 10.

Although the present invention has been described with reference to preferred embodiments, workers skilled in the art will recognize that changes may be made in form and detail without departing from the spirit and scope of the invention.

What is claimed is:

1. A microwave sensor antenna comprising:

a waveguide of circular intersection having a first end and a second end;

an antenna centric duct in form of a long cylinder having a coaxial channel of circular intersection at a first end, and a coaxial screwed tongue at second end, wherein on about one third of cylinder length there is a first lateral screwed port;

a cylindrical housing having a cylindrical hollow in which there is an antenna sleeve with a necking placed along a longitudinal axis of the cylindrical housing, wherein with the help of a tongue, the antenna centric duct is coaxially connected to the cylindrical housing;

a short waveguide support inside the first lateral screwed port of the antenna centric duct, the short waveguide support having a free end and a first transverse cut disposed in the free end, wherein the first end of the waveguide in shape of a rod of circular intersection is located in the first transverse cut;

a long waveguide support located in a second lateral screwed port of the cylindrical housing, wherein the long waveguide support has a second transverse cut disposed in one end, and the second end of the waveguide is located in the second transverse cut; and a cut of rectangular intersection along the longitudinal axis of cylindrical housing to a depth of about one third of the cylindrical housing length.

2. The antenna according to claim 1, wherein the waveguide is located in a cylindrical longitudinal channel which is manufactured in parallel to the longitudinal axis of the cylindrical housing, and the waveguide is connected with the cylindrical hollow in the cylindrical housing.

3. The antenna according to claim 1, wherein the cut of rectangular intersection is made in parallel to a cylindrical longitudinal channel and perpendicular to the long support of the waveguide and the short support of the waveguide.

4. The antenna according to claim 1, further comprising:

a transversal cylindrical hollow made at an end of the cut of rectangular intersection inside the housing, wherein the transversal cylindrical hollow has a diameter equal to twice the widths of the cut of rectangular intersection, and an axis placed on an outside wall face of the cut.

5. The antenna according to claim 1, further comprising:

a coaxial hole located inside the cylindrical housing along the short waveguide support, wherein the coaxial hole is equipped with a fine thread, and inside the coaxial hole there is an antenna adjusting screw cooperating with a back nut.

6. The antenna according to claim 1, further comprising:

a clamp nut with an escapement and an antenna back nut, the clamp nut and the antenna back nut being located on an outside wall face of the cylindrical housing.

7. The antenna according to claim 1, wherein the coaxial cylindrical hollow, cylindrical longitudinal channel, and/or the cut of rectangular intersection is filled with a dielectric body.

* * * * *